(12) United States Patent
Guzman et al.

(10) Patent No.: US 11,931,741 B2
(45) Date of Patent: Mar. 19, 2024

(54) UNIFORMLY PRESSING MICRO-VALVE SYSTEM FOR CONTROLLING PATH OF FLUIDS IN MINIATURIZED CAPILLARY CONNECTIONS AND METHODS OF FABRICATION

(71) Applicant: PRINCETON BIOCHEMICALS, INC, Princeton, NJ (US)

(72) Inventors: Norberto Guzman, East Brunswick, NJ (US); Daniel E. Guzman, East Brunswick, NJ (US)

(73) Assignee: Princeton Biochemicals, Inc, Princeton, NJ (US)

( * ) Notice: Subject to any disclaimer, the term of this patent is extended or adjusted under 35 U.S.C. 154(b) by 360 days.

(21) Appl. No.: 17/317,184

(22) Filed: May 11, 2021

(65) Prior Publication Data
US 2021/0260590 A1  Aug. 26, 2021

Related U.S. Application Data

(62) Division of application No. 29/769,253, filed on Feb. 4, 2021, now Pat. No. Des. 970,041, and a division of application No. 29/682,566, filed on Mar. 6, 2019, now Pat. No. Des. 919,833.

(51) Int. Cl.
*B01L 3/00* (2006.01)
(52) U.S. Cl.
CPC ......... *B01L 3/567* (2013.01); *B01L 2200/025* (2013.01); *B01L 2200/0605* (2013.01);
(Continued)

(58) Field of Classification Search
CPC ............... B01L 3/567; B01L 2200/025; B01L 2200/0605; B01L 2200/0689;
(Continued)

(56) References Cited

U.S. PATENT DOCUMENTS 2,478,595 A * 8/1949 Richter ................ A61B 17/282
606/206
3,322,147 A * 5/1967 Barrows .................... F16K 7/07
137/251.1
(Continued)

FOREIGN PATENT DOCUMENTS

DE         4417251        11/1995
DE      102008054222       9/2010
(Continued)

OTHER PUBLICATIONS

Pero-Gascon et al., Analytical Chimica Acta, vol. 1140, pp. 1-9, 2020.
(Continued)

*Primary Examiner* — Jill A Warden
*Assistant Examiner* — Alex Ramirez
(74) *Attorney, Agent, or Firm* — Calderone Bullock LLC

(57) ABSTRACT

Micro-valve system includes two or more superimposed tubes and a pressing device for fluid control in miniaturized capillary connections. The micro-valve system and method of fabrication can be tailored to the requirements of a wide range of applications; composition, sturdiness and thickness of plastic tubes; and capable of been adapted to the resilient of mechanical pressure and the passing and transport of fluid types.

21 Claims, 9 Drawing Sheets

(52) U.S. Cl.
CPC .............. *B01L 2200/0689* (2013.01); *B01L 2300/0838* (2013.01); *B01L 2300/12* (2013.01); *B01L 2300/123* (2013.01); *B01L 2300/14* (2013.01); *B01L 2400/0406* (2013.01); *B01L 2400/0622* (2013.01)

(58) Field of Classification Search
CPC ......... B01L 2300/0838; B01L 2300/12; B01L 2300/123; B01L 2300/14; B01L 2400/0406; B01L 2400/0622
See application file for complete search history.

(56) References Cited

U.S. PATENT DOCUMENTS

| | | | |
|---|---|---|---|
| 5,050,838 | A | 9/1991 | Beatty et al. |
| 5,202,010 | A | 4/1993 | Guzman |
| 5,449,064 | A | 9/1995 | Hogan et al. |
| 5,573,280 | A * | 11/1996 | Salter .................... F16L 37/144 285/305 |
| 6,592,098 | B2 | 7/2003 | Kao et al. |
| 6,626,416 | B2 | 9/2003 | Sharma et al. |
| 6,845,962 | B1 | 1/2005 | Barron et al. |
| 6,986,365 | B2 | 1/2006 | Henning et al. |
| 7,040,349 | B2 | 5/2006 | Moler et al. |
| 7,169,314 | B2 | 1/2007 | Unger et al. |
| 7,216,671 | B2 | 5/2007 | Unger et al. |
| 7,367,359 | B2 | 5/2008 | Maluf et al. |
| 7,438,030 | B1 | 10/2008 | Okojie |
| 7,459,070 | B2 | 12/2008 | Liu et al. |
| 7,505,110 | B2 | 3/2009 | Furukawa et al. |
| 8,071,056 | B2 | 12/2011 | Burns et al. |
| 8,480,974 | B2 | 7/2013 | Rapp et al. |
| 8,911,688 | B2 | 12/2014 | Gransee et al. |
| 8,932,461 | B2 | 1/2015 | Quake et al. |
| 9,546,743 | B2 | 1/2017 | Livermore-Clifford et al. |
| 9,638,350 | B2 | 5/2017 | Bustgens |
| 9,897,233 | B2 | 2/2018 | Zhang |
| 10,576,201 | B2 | 3/2020 | Payne et al. |
| 10,948,102 | B2 | 3/2021 | Fuller et al. |
| 2001/0007641 | A1 * | 7/2001 | Jovanovich ........ G01N 30/6078 422/538 |
| 2002/0175302 | A1 | 11/2002 | Wetzel et al. |
| 2004/0079424 | A1 | 4/2004 | Takeda et al. |
| 2004/0120836 | A1 | 6/2004 | Dai et al. |
| 2006/0227513 | A1 | 10/2006 | Dishongh et al. |
| 2007/0237686 | A1 | 10/2007 | Mathies et al. |
| 2009/0060797 | A1 | 3/2009 | Mathies et al. |
| 2010/0058841 | A1 | 3/2010 | Wilen |
| 2011/0114869 | A1 | 5/2011 | Schaeffer et al. |
| 2012/0056116 | A1 | 3/2012 | Landers et al. |
| 2012/0074066 | A1 | 3/2012 | Sun et al. |
| 2015/0093304 | A1 * | 4/2015 | Guzman .......... G01N 27/44743 422/527 |
| 2017/0256901 | A1 * | 9/2017 | Boutin ............... H01R 43/0427 |
| 2020/0240547 | A1 | 7/2020 | Fuller et al. |

FOREIGN PATENT DOCUMENTS

| | | | |
|---|---|---|---|
| EP | 1065378 | A3 | 5/2001 |
| EP | 0828101 | B1 | 4/2003 |
| EP | 2259072 | A1 | 12/2010 |
| WO | 199814707 | A1 | 4/1998 |
| WO | 2002061313 | | 8/2002 |
| WO | 2004042357 | A3 | 5/2004 |
| WO | 2008002462 | A3 | 1/2008 |
| WO | 2010019665 | A2 | 2/2010 |

OTHER PUBLICATIONS

Römer et al., Electrophoresis, vol. 42, pp. 374-380, 2021.
Golozar et al., MethodsX, vol. 7, 101043, doi:10.1016/j.mex.2020.101043, 2020.
Bonvent et al., Journal of Chromatography A, vol. 756, pp. 233-243, 1996.
Ponton and Evans, Analytical Chemistry, vol. 73, pp. 1974-1978, 2001.
Graf et al., Electrophoresis, vol. 26, pp. 2409-2417, 2005.
Jung et al., Journal of Micromechanics and Microengineering, vol. 25, 125004, doi:10.1088/0960-1317/25/125004, 2015.
Dixon et al., Annals of Clinical Biochemistry, vol. 13, pp. 409-432, 1976.
Bird, British Medical Journal, vol. 299, pp. 783-787, 1989.
Pitt, Clinical Biochemist Review, vol. 30, pp. 19-34, 2009.
Li et al., Electrophoresis, vol. 38(22-23), pp. 2837-2850, 2017.
O'Farrell, Journal of Biological Chemistry, vol. 250(10), pp. 4007-4021, 1975.
O'Connell et al., American Family Physician, vol. 71, pp. 105-112, 2005.
Guzman et al., Analytical Chemistry, vol. 77, pp. 60A-67A, 2005.
Guzman N.A. et al., Journal of Chromatography B, vol. 1021, pp. 14-29, 2016.
Voeten et al., Analytical Chemistry, vol. 90, pp. 1464-1481, 2018.
Guzman et al., Biomedicines, vol. 8, p. 255; doi:10.3390/biomedicines8080255, 2020.
Hassan, Encyclopedia, vol. 1, pp. 30-41, 2021.
Gao et al., Analytical and Bioanalytical Chemistry; doi:10.1007/s00216-021-03290-y, 2021.
Pérez-Alcaraz et al., Talanta, vol. 225, 121994; doi:10.1016/j.talanta.2020.121994, 2021.
Vitorino et al., Nanomaterials, vol. 11, 1118; doi:10.3390/nano11051118, 2021.
Luo et al., Journal of the Association for Laboratory Automation, vol. 14, pp. 252-261, 2009.
Leslie et al., Nature Physics, vol. 5, pp. 231-235, 2009.
Miró et al., Trends in Analytical Chemistry, vol. 30 (1), pp. 153-164, 2011.
Xu et al., Lab on a Chip, vol. 15, pp. 867-876, 2015.
Li et al., Talanta, vol. 180, pp. 32-35, 2018.
Unger et al., Science, vol. 288, pp. 113-116, 2000.
Clark et al., Micromachines, vol. 11, 627, doi:10.3390/mi11070627, 2020.
Voldman et al., Journal of Micromechanical Systems, vol. 9, pp. 295-302, 2000.
Grover et al., Sensors and Actuators B: Chemical, vol. 89, pp. 315-323, 2003.
Li et al., Electrophoresis, vol. 26, pp. 3758-3764, 2005.
Sundararajan et al., Lab on a Chip, vol. 5, pp. 350-354, 2005.
Baek et al., Journal of Micromechanics and Bioengineering, vol. 15, p. 1015-1520, 2005.
Oh et al., Journal of Micromechanics and Microengineering, vol. 16, pp. R13-R39, 2006.
Kaigala et al., Lab on a Chip, vol. 8, pp. 1071-1080, 2008.
Hulme et al., Lab on a Chip, vol. 9, doi:10.1039/b809673b, pp. 79-86, 2008.
Vásquez et al., Analytica Chimica Acta, vol. 668, pp. 100-113, 2010.
Sin et al., Journal of Biological Engineering 5, 6; http://www.jbioleng.org/content/5/1/6, 2011.
Au et al., Micromachines, vol. 2, pp. 179-220, 2011.
Desai et al., Lab on a Chip, vol. 12, p. 1078-1088, doi:10.1039/c21c21133e, 2012.
Collino et al., Lab on a Chip, vol. 13, pp. 3668-3674, 2013.
Park et al., Journal of Micromechanics and Microengineering, vol. 24, 027002, 2014.
Evander et al., Journal of Micromechanics and Microengineering, vol. 24, 027003, 2014.
Johnston et al., Journal of Micromechanics and Microengineering, vol. 24, 035017, 2014.
Ali et al., Current Chromatography, vol. 1, pp. 81-89, 2014.
Kelly et al., Analytical Chemistry, vol. 86, pp. 6723-6729, 2014.
McDaniel et al., IEEE Design & Test, doi:10.1109/MDAT.2015.2459699, 2015.
Han et al., Analyst, vol. 140, pp. 162-173, 2015.
Kohl et al., Electrophoresis, vol. 37, pp. 954-958, 2016.
Koenka et al., Analytical Chemistry, 7, 3761-3767, 2016.
Ha et al., Analytica Chimica Acta, vol. 985, pp. 129-140, 2017.
Liu et al., Electrophoresis, vol. 40, pp. 1722-1730, 2019.
Wei et al., Talanta, vol. 198, pp. 404-411, 2019.

(56) References Cited

OTHER PUBLICATIONS

Tanaka et al., Scientific Reports, vol. 9, 8042, doi:10.1038/s41598-019-44116-3, 2019.
Jender at al., Analytical Chemistry, vol. 92, pp. 6764-6769, 2020.
Arango et el., Science Advances, vol. 6, eaay8305, 2020.
Jang et al., Analyst, 146, 1932-1939, 2021.

\* cited by examiner

UNIFORMLY PRESSING MICRO-VALVE SYSTEM FOR CONTROLLING PATH OF FLUIDS IN MINIATURIZED CAPILLARY CONNECTIONS AND METHODS OF FABRICATION

BACKGROUND OF THE INVENTION

Field of the Invention

The field of the present invention relates generally to the use of a micro-valve in miniaturized capillary connections, more particularly, to the use of two small diameter capillaries tightly connected within a short distance by a small and flexible plastic tube externally shielded by one or more thicker, less flexible and sturdier plastic tubes. A uniform-pressure pressing system is applied over the external plastic tubes allowing for the complete blockage of the passage of fluid within the two small diameter capillaries. The opening and closing mechanism for controlling the passage of fluid is performed by applying or releasing an external pressure either manually or electronically.

Description of Related Art

Given the complexity of most chemical and biological mixtures, in particular biological samples (e.g., serum, urine, saliva, tears, exhaled breath, other bodily fluids, tissues, cells, vesicles, nanoparticles, and their constituent components), sample preparation has been, and continues to be, one of the critical challenges in bioanalysis, especially in the area of biomarker discovery. Numerous techniques have been developed over the years to quantify small molecules and biomolecules. However, before individual chemical and biological components present in complex mixtures can be analyzed, a process of isolation and purification must occur. A sample to be analyzed must first be made simpler, as much as possible, into its constituent components. Sample constituents are isolated and separated based on physical and/or chemical properties, such as size, density, shape, mass and chemical affinity. Ideally, the method to separate individual molecular entities should involve one or two purification steps; however, multiple operations are generally required to achieve the desired separation(s).

Chromatographic and electrophoretic techniques have been the major tools used for the separation of a wide range of substances in complex mixtures. In a typical standard chromatography process, there is the need of at least one or more valves to make the chromatography system optimal operative (Dixon et al., Annals of Clinical Biochemistry, volume 13, pages 409-432; Bird, British Medical Journal, volume 299, pages 783-787, 1989; Pitt, Clinical Biochemist Review, volume 30, pages 19-34, 2009; Li et al., Electrophoresis, volume 38, pages 2837-2850, 2017). Conventional electrophoresis and capillary electrophoresis have also been used for the separation of many substances, in particular biomolecules (O'Farrell, Journal of Biological Chemistry, volume 250, pages 4007-402, 1975; O'Connell et al., American Family Physician, volume 71, pages 105-112, 2005; Guzman et al., Analytical Chemistry, volume 77, pages 60A-67A, 2005; Guzman N. A. et al., Journal of Chromatography B, volume 1021, pages 14-29, 2016; Voeten et al., Analytical Chemistry, volume 90, pages 1464-1481, 2018; Guzman et al., Biomedicines, volume 8, page 255; doi: 10.3390/biomedicines8080255, 2020; Hassan, Encyclopedia, volume 1, pages 30-41, 2021; Gao et al., Analytical and Bioanalytical Chemistry; doi:10.1007/s00216-021-03290-y, 2021; Perez-Alcaraz et al., Talanta, volume 225, 121994; doi:10.1016/j.talanta.2020.121994, 2021; Vitorino et al., Nanomaterials, volume 11, 1118; doi:10.3390/nano11051118, 2021.

Valves are commonly used in devices that involve the transportation of a fluid. Valves play an essential role in manipulating fluid flow, particularly in applications where performance precision and efficiency are dependent on the system's ability to satisfy and maintain a specified parameter. In the case of separation science, valves are ubiquitous in all chromatography applications, as well as in some electrophoresis applications. The valves function as a switch to control the flow and direction path of a liquid or gas in various ways. Numerous types of valves for fluid control have been described in the literature (Luo et al., Journal of the Association for Laboratory Automation, volume 14, pages 252-261, 2009; Leslie et al., Nature Physics, volume 5, pages 231-235, 2009; Miro et al., Trends in Analytical Chemistry, volume 30, pages 153-164, 2011; Xu et al., Lab on a Chip, volume 15, pages 867-876, 2015; Li et al., Talanta, volume 180, pages 32-35, 2018; Wilen, U.S. Patent Application No. US2010/00588, Mar. 11, 2020; Clark et al., Micromachines, volume 11, 627, doi:10.3390/mi11070627, 2020).

Controlling the flow path of fluids in miniaturized instruments remains a persistent challenge, in particular when referring to the development of inexpensive and portable point-of-care diagnostic tools, devices and instruments. In relation to microchip formats, there are many techniques that allow for control of fluid path in the microchannels or microcapillaries, including electrical, chemical, pneumatical, optical, magnetic, and thermally actuated micro-valves. Additionally, it is possible to control the path of fluid by an earthworm muscle-driven valve, which can be electrical or chemically operated (Beatty et al., U.S. Pat. No. 5,050,838, 1991; Schuelke et al., German Patent No. DE 4417251, 1995; 1995; Biegelsen et al., European Patent EP 0 828 101, 1998; Maillefer et al., PCT Patent No. WO 98/14707, 1998; Barron et al., U.S. Pat. No. 6,845,962, 2005; Unger at al., European Patent No. EP 1 065 378, 2001; Hettinger et al., PCT No. WO 2002/061313, 2002; Wetzel, et al., U.S. Patent Publication No. US 2002/0175302, 2002; Kao et al., U.S. Pat. No. 6,592,098, 2003; Sharma et al., U.S. Pat. No. 6,626,416, 2003; Burns et al., PCT Patent No. WO 2004/042357, 2004; Dai et al., U.S. Patent Publication No. US 2004/0120836, 2004; Takeda et al., U.S. Patent Publication No. US 2004/0079424, 2004; Henning et al., U.S. Pat. No. 6,986,365, 2006; Moler at al., U.S. Pat. No. 7,040,349, 2006; Mathies et al., U.S. Patent Publication No. US 2007/0237686, 2007; Unger at al., U.S. Pat. No. 7,169,314, 2007; Unger et al., U.S. Pat. No. 7,216,671, 2007; Okojie, U.S. Pat. No. 7,438,030, 2008; Battrell, et al., PCT Patent Publication No. WO 2008/002462, 2008; Maluf et al., U.S. Pat. No. 7,367,359, 2008; Furukawa et al., U.S. Pat. No. 7,505,110, 2009; Mathies et al., U.S. Patent Publication No. 2009/0060797, 2009; Lenz et al., German Patent No. DE 102008054222, 2010; Dishongh et al., U.S. Patent Publication No. US 2006/022751, 2010; Hunnicutt, PCT Patent No. WO 2010/019665, 2010; Burn et al., U.S. Pat. No. 8,071,056, 2011; Schaeffer et al., U.S. Patent Publication No. U.S. 2011/0114869, 2011; Landers et al. U.S. Patent Publication No. US 2012/0056116, 2012; Sun et al., U.S. Patent No. US 2012/0074066, 2012; Rapp et al, U.S. Pat. No. 8,480,974, 2013; Gransee et al., U.S. Pat. No. 8,911,688, 2014; Quake et al., U.S. Pat. No. 8,932,461, 2015; Asogawa, M., European Patent No. EP2259072, 2016; Büstgens, U.S. Pat. No. 9,638,350, 2017; Livermore-Clifford et al., U.S. Pat. No.

9,546,743, 2017; Zhang, U.S. Pat. No. 9,897,233, 2018; Fuller at al., U.S. Patent Publication No. 2020/0240547, 2020; Payne et al., U.S. Pat. No. 10,576,201, 2020; Fuller et al., U.S. Pat. No. 10,948,102, 2021; Unger et al., Science, volume 288, pages 113-116, 2000; Voldman et al., Journal of Micromechanical Systems, volume 9, pages 295-302, 2000; Grover et al., Sensors and Actuators B: Chemical, volume 89, pages 315-323, 2003; Li et al., Electrophoresis, volume 26, pages 3758-3764, 2005; Sundararajan et al., Lab on a Chip, volume 5, pages 350-354, 2005; Baek et al., Journal of Micromechanics and Bioengineering, volume 15, page 1015, 2005; Oh et al., Journal of Micromechanics and Microengineering, volume 16, pages R13-R39, 2006; Kaigala et al., Lab on a Chip, volume 8, pages 1071-1080, 2008; Hulme et al., Lab on a Chip, volume 9, doi:10.1039/b809673b, 2009; Vasquez et al., Analytica Chimica Acta, volume 668, pages 100-113, 2010; Sin et al., Journal of Biological Engineering 5, 6; http://www.jbioleng.org/content/5/1/6, 2011; Au et al., Micromachines, volume 2, pages 179-220, 2011; Desai et al., Lab on a Chip, volume 12, page 1078, doi:10.1039/c21c21133e, 2012; Collino et al., Lab on a Chip, volume 13, pages 3668-3674, 2013; Park et al., Journal of Micromechanics and Microengineering, volume 24, 027002, 2014; Evander et al., Journal of Micromechanics and Microengineering, volume 24, 027003, 2014; Johnston et al., Journal of Micromechanics and Microengineering, volume 24, 035017, 2014; Ali et al., Current Chromatography, volume 1, pages 81-89, 2014; Kelly et al., Analytical Chemistry, volume 86, pages 6723-6729, 2014; McDaniel et al., IEEE Design & Test, doi:10.1109/MDAT.2015.2459699, 2015; Han et al., Analyst, volume 140, pages 162-173, 2015; Kohl et al., Electrophoresis, volume 37, pages 954-958, 2016; Koenka et al., Analytical Chemistry, 7, 3761-3767, 2016; Ha et al., Analytica Chimica Acta, volume 985, pages 129-140, 2017; Liu et al., Electrophoresis, volume 40, pages 1722-1730, 2019; Wei et al., Talanta, volume 198, pages 404-411, 2019; Tanaka et al., Scientific Reports, volume 9, 8042, doi:10.1038/s41598-019-44116-3, 2019; Jender at al., Analytical Chemistry, volume 92, pages 6764-6769, 2020; Arango et al., Science Advances, volume 6, eaay8305, 2020; Jang et al., Pero-Gascon et al., Analytical Chimica Acta, volume 1140, pages 1-9, 2020; Analyst, 146, 1932-1939, 2021; Römer et al., Electrophoresis, volume 42, pages 374-380, 2021.

A selected type of valve has been used for controlling fluid flow in conventional capillary electrophoresis systems particularly when using fused-silica glass tubing (Guzman, U.S. Pat. No. 5,202,010, 1993; Hogan et al., U.S. Pat. No. 5,449,064, 1995; Ponton and Evans, Analytical Chemistry, volume 73, pages 1974-1978, 2001; Liu et al., U.S. Pat. No. 7,459,070, 2008; Han et al., Analyst, volume 140, pages 162-173, 2015; Jung et al., Journal of Micromechanics and Microengineering, volume 25, 125004, doi:10.1088/0960-1317/25/125004, 2015).

Several commercially available miniaturized valves are known, such as LabSmith Corporation (California, USA), Parker Hannifin Corporation (New Hampshire, USA), The Lee Company (Connecticut, USA), DunAn Microstaq, Inc. (Texas, USA), Kuhnke North America (New Jersey, USA), Takasago Fluidic Systems-Takasago Electric, Inc. (Nagoya, Japan), Bürkert Fluid Control Systems (Ingelfingen, Germany), Memetis GmbH (Karlsruhe, Germany), and others. Although the commercial miniaturized valves have unique features, the internal connections of most of them tend to clog when using buffers containing high concentrations of salts and must be washed extensively with water after use. When these miniaturized valves do break, they are expensive to repair.

Most of the commercially available miniaturized valves are designed to act as a bridge device between two pieces of fused silica capillaries, where the fluid path can be interrupted inside the device by shutting off the flow of fluid using a blocking module that can be made to allow or interrupt the flow of fluid. A fused-silica glass capillary coated with a polymeric polyimide is rigid and has the shortcoming that it cannot be pressed down as capillaries made of plastic materials can. Bare capillaries without a coating are fragile and can break easily. Most plastic tubes usually have the distinguishing characteristic of being capable of springing back to their original form after been pressed down. The elasticity of the plastic tube is dependent upon its chemical composition making it more or less flexible.

A number of unique optical, mechanical and thermal properties have made fused-silica quartz glass an indispensable material for use in capillary electrophoresis applications. Particularly, quartz material that has high optical transparency from the ultraviolet to the infrared spectral range, yielding very low-fluorescence background when coupled with laser-induced fluorescence (LIF), and thus generating high sensitivity detection of targeted analytes. As a result, fused-silica glass capillaries have been the preferred material for bioanalysis using capillary electrophoresis, since glass is inert to most chemicals and biochemicals and does not adsorb reagents or chemicals like soft polydimethylsiloxane (PDMS) lithographic devices (Golozar et al., MethodsX, volume 7, 101043, doi:10.1016/j.mex.2020.101043, 2020), with the exception of biopolymers such as proteins that tend to bind to the inner surface of bare capillaries (Bonvent et al., Journal of Chromatography A, volume 756, pages 233-243, 1996; Graf et al., Electrophoresis, volume 26, pages 2409-2417, 2005).

Even with the availability of commercial micro-valves and with many modifications made to existing micro-valves, primarily for capillary electrophoresis in microchip format, there is a need to ensure and improve reliability and repeatability for micro-valves to be used in conventional capillary electrophoresis employing fused-silica glass capillaries as the separation passages. This deficit is particularly acute when using a wide range of organic solvents, acids, bases, and buffers containing high concentration salts, making them much more susceptible to failures such as leakage and breakdown. Many valves have intricate principles of actuation and elaborate fabrication procedures.

Based on these deficiencies, it is desirable to provide a valve system having the shortest connection distance between two pieces of fused-silica glass capillaries that can be easy to replace and be cost effective. In addition, the valve system should be capable of providing a robust and durable performance to withstand the demands of operating environments and allow for a smooth fluid path without clogging or microbubble formation, when the separation requires high salt concentration reagents and/or the presence of various types of organic solvents. It is desirable to ensure reliability and repeatability when using micro-valves; otherwise, irreproducibility of results is a common outcome. Carry over must be avoided at all times. It is desirable to provide micro-valves that have great durability and capable of reaching a longer life. Particularly, when dealing with challenging separations of a wide range of biomolecules using capillary electrophoresis. Micro-valves should be easy to integrate and be inexpensive and simple to be manufactured.

OBJECTS OF THE INVENTION

Accordingly, it is a general object of the present invention to provide an improved micro-valve device having a uniformly pressing system for controlling path of fluids in miniaturized capillary connections. The miniaturized valve, or micro-valve, is intended to be used primarily for small size internal diameter capillaries ranging from 2 microliters to 200 microliters. However, larger diameters can also be used.

It is another object of the present invention to provide a valving system having the shortest connection distance between two pieces of fused-silica glass capillaries or polymeric material-made capillaries that is easy to replace and be cost effective.

An additional object of the present invention is to provide a valving system having two or more superimposed layers of soft and hard flexible plastic tubes for connection and compression.

A further object of the present invention is to provide a valving system where the plastic or polymeric-made tube connecting the two capillaries should be flexible and capable of providing a robust and durable function to withstand the demands of the operating environments permitting the use of organic solvents and buffers with acidic and basic pHs and containing high salt concentrations.

It is still a further object of the present invention to provide a valving system where the plastic or polymeric-made tube connecting the two capillaries must be flexible, tight and hermetically sealed to avoid any type of leakage in the system.

It is another object of the present invention to provide a valving system that the two or more superimposed plastic tubes comprising soft and hard flexible materials and compressing the connecting tube can be compressed using an external uniformly pressing force.

It is yet another object of the present invention to provide a valving system having a pressing force operated manually or by a computer-controlled system.

A further object of the present invention is to provide a valving system that when used manually, the micro-valve can be controlled by a tube occluding forceps clamp made of plastic or metal to generate enough force to press down uniformly the two or more layers of tubing and block the path of fluid.

An additional object of the present invention is to provide a valving system that when used by a computer-controlled system, the micro-valve can be controlled by a tube occluding motorized pressing bar made of hard plastic, non-metal polymeric material, or metal to generate enough force to press down uniformly the two or more layers of tubing and block the path of fluid.

It is another object of the present invention to provide a valving system that can be secured to two main support and pillar structures and to a solid base to maintain immovable the entire micro-valve system.

It is yet another object of the present invention to provide a valving system that can be easy to replace and be cost effective.

Additional objects of the present invention will be apparent to those skilled in the relevant art.

SUMMARY OF THE INVENTION

In one aspect of the invention two pieces of fused-silica glass capillaries can be connected by a flexible sleeve connector made of plastic or polymeric-made tube having the shortest connection distance between them, but enough space to generate a valving system that when compressing the connecting plastic or polymeric-made tube, superimposed by one or more flexible plastic or non-metal polymeric-made tubes, there is a complete blockage of fluid path from one fused-silica glass or polymeric-made material capillary to the other.

A protection of the flexible sleeve connector tube by superimposing one or more plastic or polymeric-made tubes is essential for continuously pressing and releasing the pressure of the one or more layers of tubing to block the path of fluid, without disfiguring the system or breaking the capillaries.

The present invention is a low cost and simple to fabricate device, made of short pieces of two or more layers of soft and hard flexible plastic tubes for connection and compression. Because of its nature the micro-valve system is configured to facilitate unidirectional or bidirectional flow and easily replaceable; it is an advantageous device to use in medical instruments or devices and other applications. When used manually, the micro-valve system can be controlled by a tube occluding forceps clamp made of plastic or metal to generate enough force to press down the two or more layers of tubing and block the path of fluid. Upon removing the forces producing the pressure, the connecting plastic tubing returns to its normal shape allowing for the fluid to continue its path. When using an electronic control mode, the micro-valve system can be operated employing a hard plastic or metal pressing system, providing enough controllable force to press down the two or more layers of flexible tubing to block the path of fluid without disfiguring the system or breaking the capillaries.

Other alternative types and shapes of pressing micro-valve system can be used to press uniformly the tubes for connection, compression and decompression, such as for example a circular or radial pressing system.

The pressing micro-valve system for controlling path of fluids in miniaturized capillary connections can be used in capillary electrophoresis. Capillary electrophoresis is a family of electrokinetic separation methods that include nine modes of separation, including 1) capillary zone electrophoresis (CZE); 2) capillary isoelectric focusing (CIEF); 3) capillary gel electrophoresis (CGE); 4) capillary isotachophoresis (CITP); 6) affinity capillary electrophoresis (ACE); 7) 7) micellar electrokinetic chromatography (MEKC); 7) microemulsion electrokinetic chromatography (MEEKC); 8) capillary electrochromatography (CEC); and 9) chiral capillary chromatography (CCC). The migration of the analytes within the capillary passage or tube is performed by applying a controlled electrical field or mechanical pressure, in which the motion of the analytes can occur just by electrical separation, electro-osmotic flow, mechanical pressure, or a combination of electro-osmotic flow and mechanical pressure. Because the motion of fluids during separation of the analytes, and for sample and buffer's introduction into the capillary, occurs in general at slow speed, the pressure applied to the system of the present invention usually does not create any problem at the area of the micro-valve assembly, in particular where the tight connection takes place applying an epoxy resin or cement. However, caution must be exerted if applying high pressure, for example in a range of about 2 bar (29.0 psi) to about 4 bar (58.0 psi). As a consequence, moderate to low pressure, for example in a range of about 0.02 bar (0.29 psi) to about 1.5 bar (21.7 psi) is applied for sample and buffer's introduction, and elution when using on-line pre-concentration. The generated pressure will depend on the bore of the internal diameter and the length of the capillary, as well as the viscosity of the buffers and clean up and washing solutions. When using capillary electrochromatography (CEC), the types of packing material within the capillary and the types of frits positioned at the inlet and outlet ends of the capillary, creates backpressure. Therefore, the buffers and cleaning solutions are introduced at moderate to low pressure. However, separation of the analytes using the CEC mode usually occurs by electro-osmotic flow. The packing material and frits in CEC creates a backpressure that depend on the type of material and the length of the packing and thickness of the frits. Similarly, if such a micro-valve and method is used for nano-liquid chromatography where the pressure is usually much higher precautions must be observed at the connecting area where the epoxy resin or cement is applied, by either re-enforcing the tight connections of the system with miniaturized clamps or reducing the pressure to avoid the connections to malfunction.

A more complete understanding of embodiments of the present disclosure will be afforded to those skilled in the art, as well as a realization of additional advantages thereof, by a consideration of the following detailed description of one or more embodiments.

DETAILED DESCRIPTION

Figure 1:
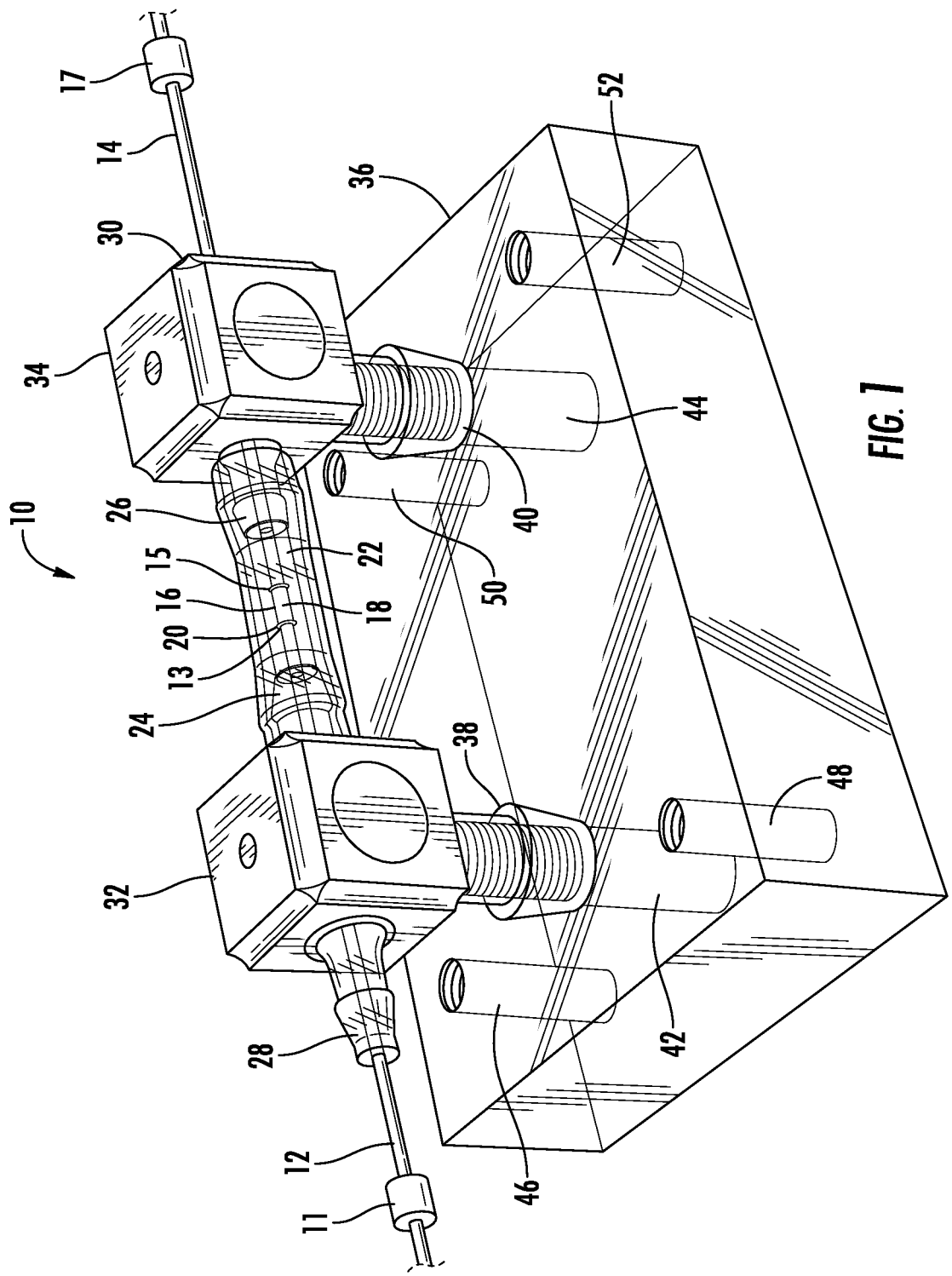
FIG. 1 is a perspective view of a micro-valve system in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates micro-valve system 10 of the present invention. Micro-valve system 10 is a miniaturized valving device comprising capillaries 12 and 14 symmetrically positioned in between support towers 32 and 34 and connected at one end by sleeve connector 16 leaving a space 18 between capillaries 12 and 14. Capillaries 12 and 14 can be formed of fused-silica glass or a polymer. Sleeve connector 16 can be formed of flexible plastic or a polymer. For example, sleeve connector 16 can be formed of flexible polyvinyl chloride (PVC) or urethane. In one embodiment, space 18 has a length in the range of about 1 to about 5 mm. Sleeve connector 16 fits very tightly between end terminal 13 of capillary 12 and end terminal 15 of capillary 14 to secure a tight and hermetically sealed connection. Additionally, resin 20 can be added to completely seal-off the connection. Couplers 11 and 17 make the entire micro-valve system 10 independent from other capillaries needed for sample and buffer's introduction into the transport capillaries or separation capillaries as described in U.S. Pat. Nos. 9,969,299 and 10,408,789, hereby incorporated by reference into this application. Micro-valve system 10 becomes a replaceable and cost-effective unit easy to be changed by another micro-valve system in a couple of minutes.

As shown in FIG. 1, micro-valve system 10 includes platform 36 having support pillar structures 38 and 40 which anchor to support towers 32 and 34. Spaces 42 and 44 are used as threaded tunnels for positioning screws to securely hold support pillar structures 38 and 40.

Support towers 32 and 34 comprises guiding tubes 24 and 26. Support towers 32 and 34 comprise guiding tubes 28 and 30 for providing a guided narrow channel to symmetrically align and provide support for capillaries 12 and 14. The platform and support towers are preferentially made of hard plastic or non-metal materials.

Platform 36 can be mounted and secured to a support structure using threaded tunnels 46, 48, 50, and 52. Threaded tunnels 46, 48, 50, and 52 or spaces allow the positioning of screws for fixing platform 36 to a support structure (not shown). Casing 22 encases capillaries 12 and 14, sleeve connector 16, and guiding tubes 24 and 26.

Figure 2:
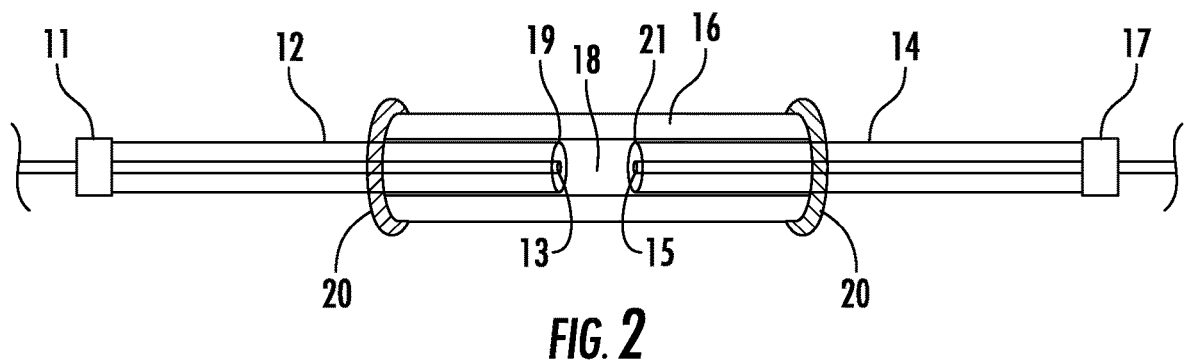
FIG. 2 is an enlarged, elevated view showing a connecting area in the micro-valve system where two capillaries are joined by a sleeve connector making the connection tight and hermetically sealed, yet leaving a sufficient length of the sleeve connector where compression can occur for blocking the passage of fluid and for allowing the passage of fluid after releasing the compression for allowing a smooth path of fluid to return.

FIG. 2 illustrates capillaries 12 and 14 symmetrically positioned within sleeve connector 16. In between terminal end 13 of capillary 12 and terminal end 15 of capillary 14 is space 18 to facilitate the compression and decompression function of sleeve connector 16 to block or allow the flow of liquid between capillaries 12 and 14. To secure a complete tight and hermetic environment free of any leakage, resin 20 can be added to junction area 19 of sleeve connector 16 and terminal end 13 of capillary 12 and junction area 21 of sleeve connector 16 and terminal end 15 of capillary 14 to completely seal-off the connection of sleeve connector 16 with capillary 12 and capillary 14. Resin 20 can be a sticky and hardening resin. A suitable material for resin 20 is an epoxy. Alternative, suitable materials for resin 20 include a natural or synthetic polyvinyl-acetate, acrylic-based resin and hybrid cementing materials to provide an improved adhesive quality for the purpose of the present invention. Alternative, suitable materials for resin 20 include adhesive films or materials described in U.S. Pat. Nos. 5,049,433, 5,625,005, 6,42,298, 6,670,417, 8,101,276 and Patent Application No. 2005/0142357, each of which is hereby incorporated by reference into this application. Sleeve connector 16 can be formed of a flexible plastic or polymer material. Suitable materials for sleeve connector 16 possess a good degree of mechanical strength and resistance to abrasion.

Figure 3:
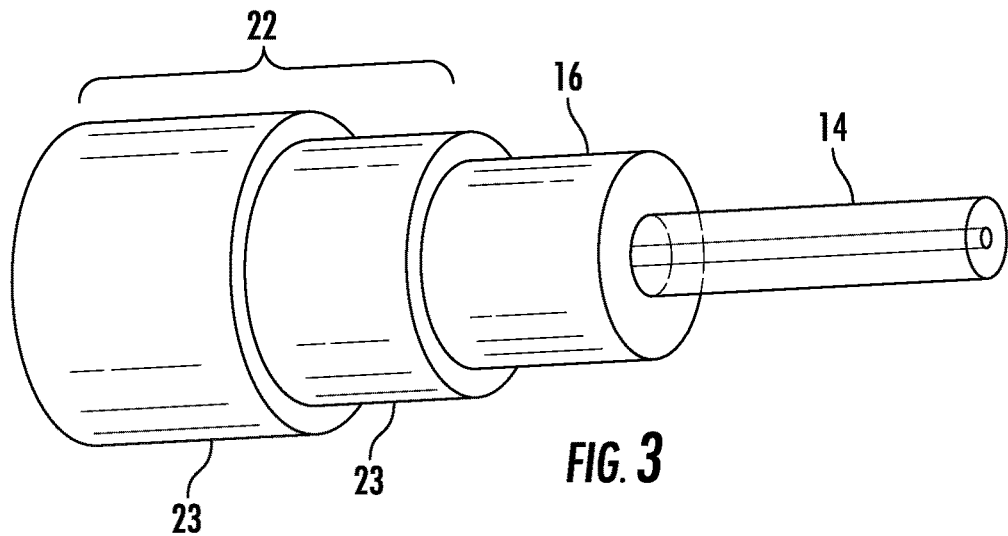
FIG. 3 is an enlarged, elevated view showing a casing comprising a plurality tubes superimposed one on another to protect the sleeve connector from deterioration and damage during compression and decompression when using external uniformly pressing force.

FIG. 3 illustrates an embodiment of casing 22 comprising a plurality of superimposed layers 23. Layers 23 can be formed of flexible hard or soft plastic. In one embodiment, layers 23 comprise a plurality of concentric polymeric tubes. Casing 22 provides protection to the sleeve connector 16 during the compression and decompression process allowing to control the passage of fluid between capillaries 12 and 14 by blocking and reversing the passage of fluid.

Figure 4:
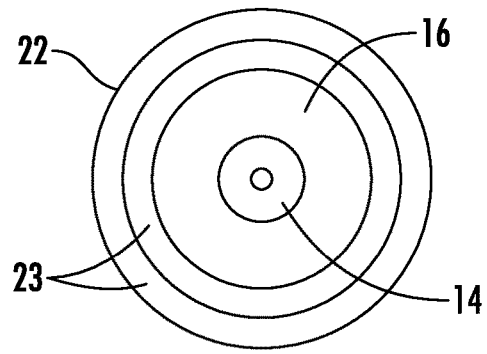
FIG. 4 is a perspective end cross-sectional view of the casing comprising a plurality of superimposed plastic tubes being concentrically positioned.

FIG. 4 illustrates an end cross-sectional view of a capillary 14 surrounded by superimposed layers of the connector tube 16 and layers 23 of casing 22.

Figure 5:
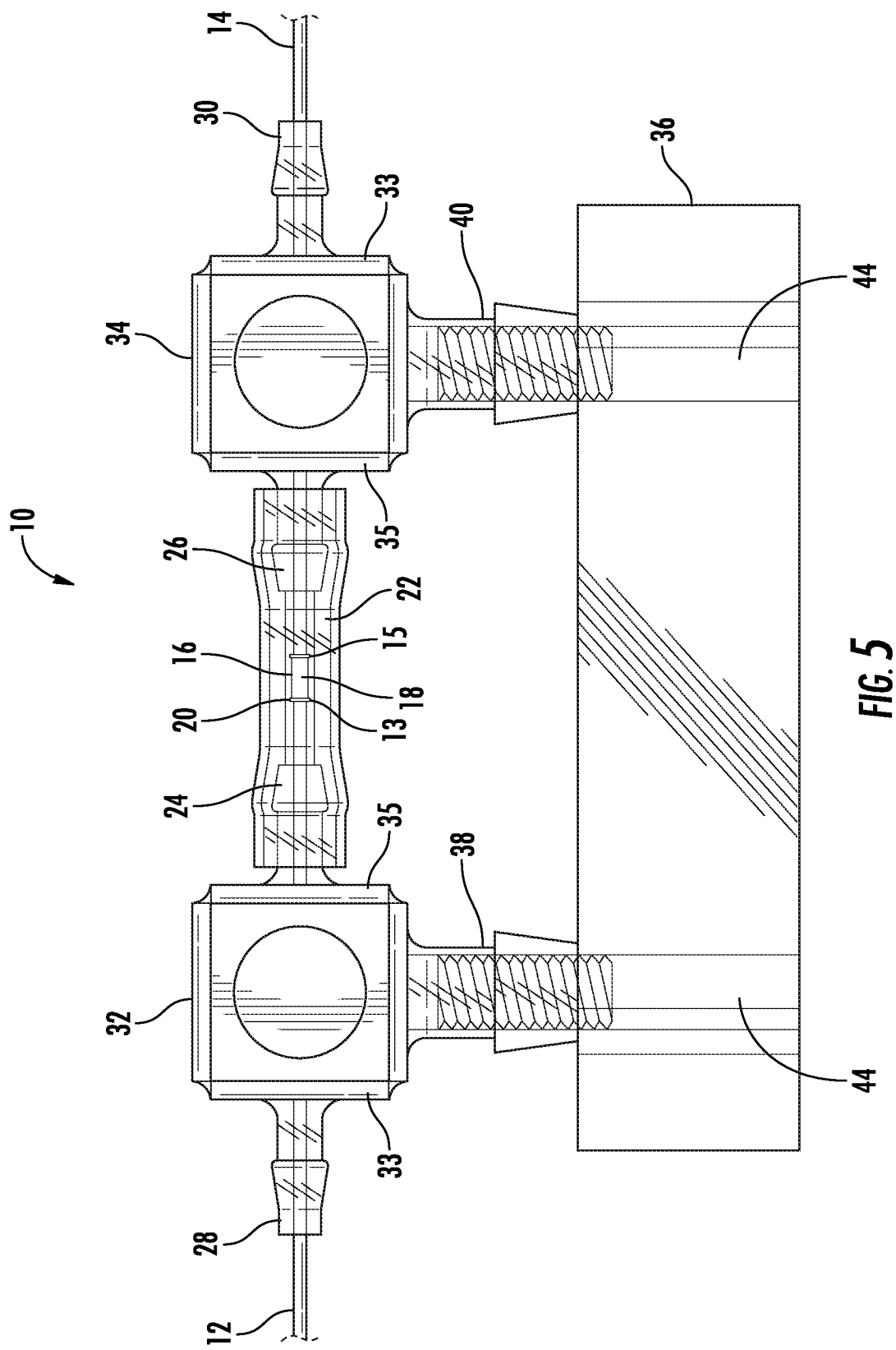
FIG. 5 illustrates a front view of the micro-valve system of the present invention. It shows capillaries symmetrically positioned within the sleeve connector and aligned horizontally with respect to support towers and a micro-valve system platform.

FIG. 5 illustrates a front view of micro-valve system 10 of the present invention. Capillaries 12 and 14 are symmetrically positioned within sleeve connector 16 and aligned horizontally with respect to support towers 32 and 34 and platform 36.

Support towers 32 and 34 comprise guiding tubes 28 and 30 positioned in an external side 33 of support towers 32 and 34 and guiding tubes 24 and 26 positioned in internal side 35 of support towers 32 and 34, that serve the purpose of providing a guided narrow channel to symmetrically align and provide an optimal support for capillaries 12 and 14. Guiding tubes 24 and 26 also provide strong support to superimposed layers 23 of casing 22 to tolerate compression generated under external pressure. Support towers 32 and 34 and support pillar structures 38 and 40 can be disconnected from platform 36 by removing screws (not shown) localized in tunnels 42 and 44. After support towers 32 and 34 and the corresponding assembled components to the tower are removed from platform 36, casing 22 can also be detached from guiding tubes 24 and 26 to easily disassemble and assemble micro-valve system 10 to change capillaries 12 and 14 if necessary.

Figure 6:
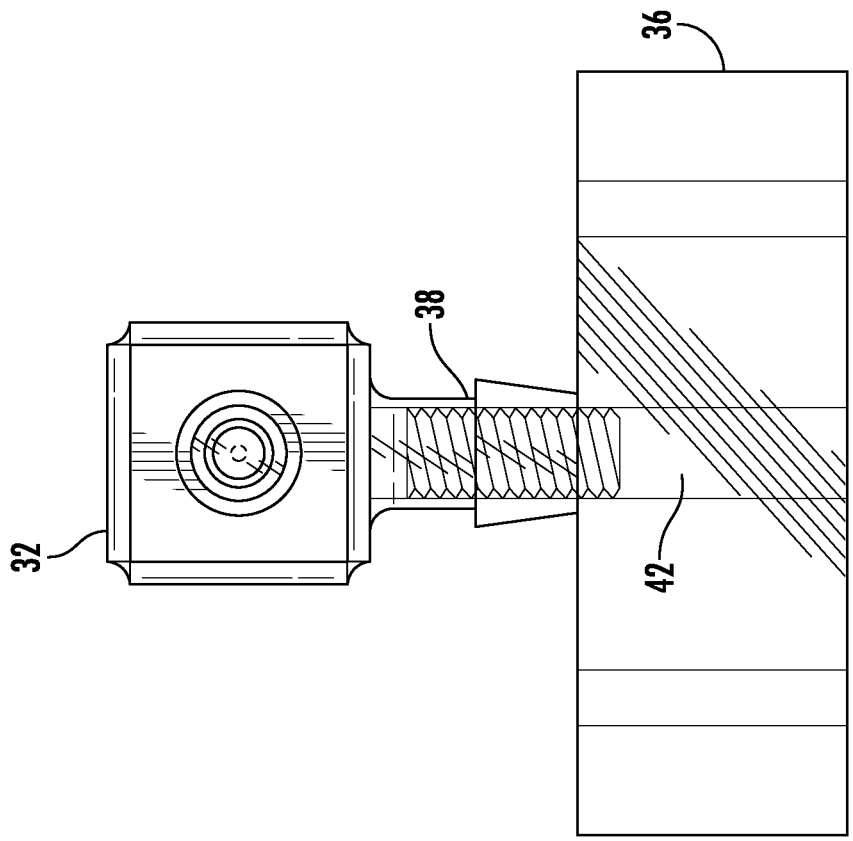
FIG. 6 illustrates a left side view of the micro-valve system of the present invention shown in FIG. 1.

FIG. 6 illustrates a left side view of micro-valve system 10 of the present invention shown in FIG. 1. Platform 36 and support tower 32 with support pillar structure 38 and threaded tunnel 42, having a location to introduce a screw, provide support to the entire micro-valve system 10.

Figure 7:
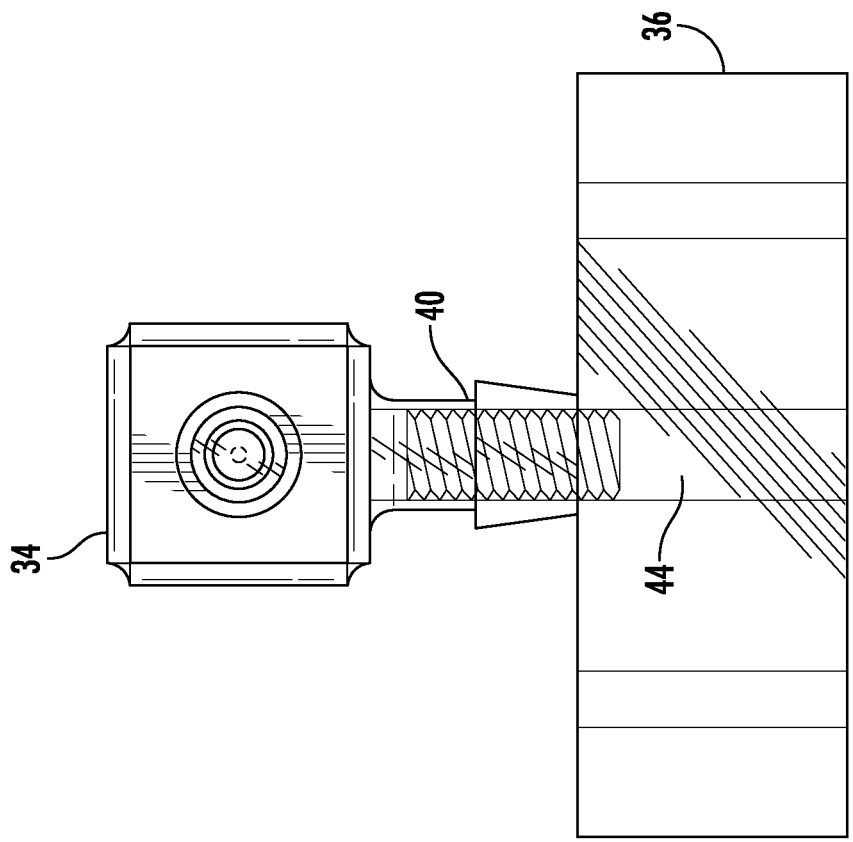
FIG. 7 illustrates a right side view of the micro-valve system of the present invention shown in FIG. 1.

FIG. 7 illustrates a right side view of micro-valve system 10 of the present invention shown in FIG. 1. Platform 36 and support tower 34 with support pillar structure 40 and tunnel threaded 44, having a location to introduce a screw, provide support to the entire micro-valve system 10.

Figure 8:
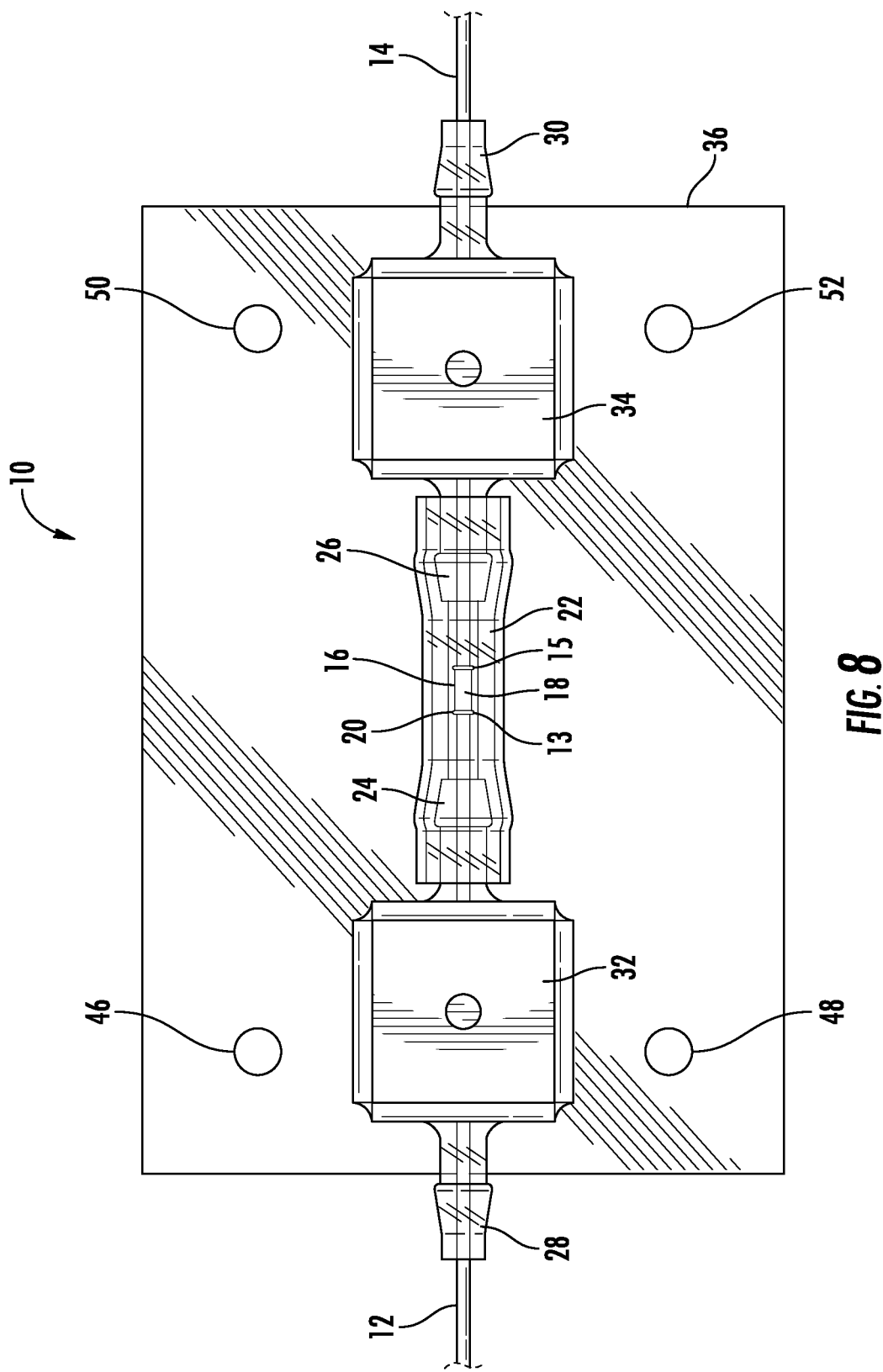
FIG. 8 illustrates a top view of the micro-valve system of the present invention shown in FIG. 1.

FIG. 8 illustrates a top view of micro-valve system 10 of the present invention. Support towers 32 and 34 and guiding tubes 24, 26, 28 and 30, support and horizontally align capillaries 12 and 14. Terminal end 13 of capillary 12 and terminal end 15 of capillary 14 are connected by sleeve connector 16 and secured by resin 20 to form a complete tight and hermetic environment free of any leakage. In between terminal ends 13 and 15 of respective capillaries 12 and 14 is space 18 made to facilitate the compression and decompression function of sleeve connector 16 to block or allow the flow of liquid between the capillaries 12 and 14.

Figure 9:
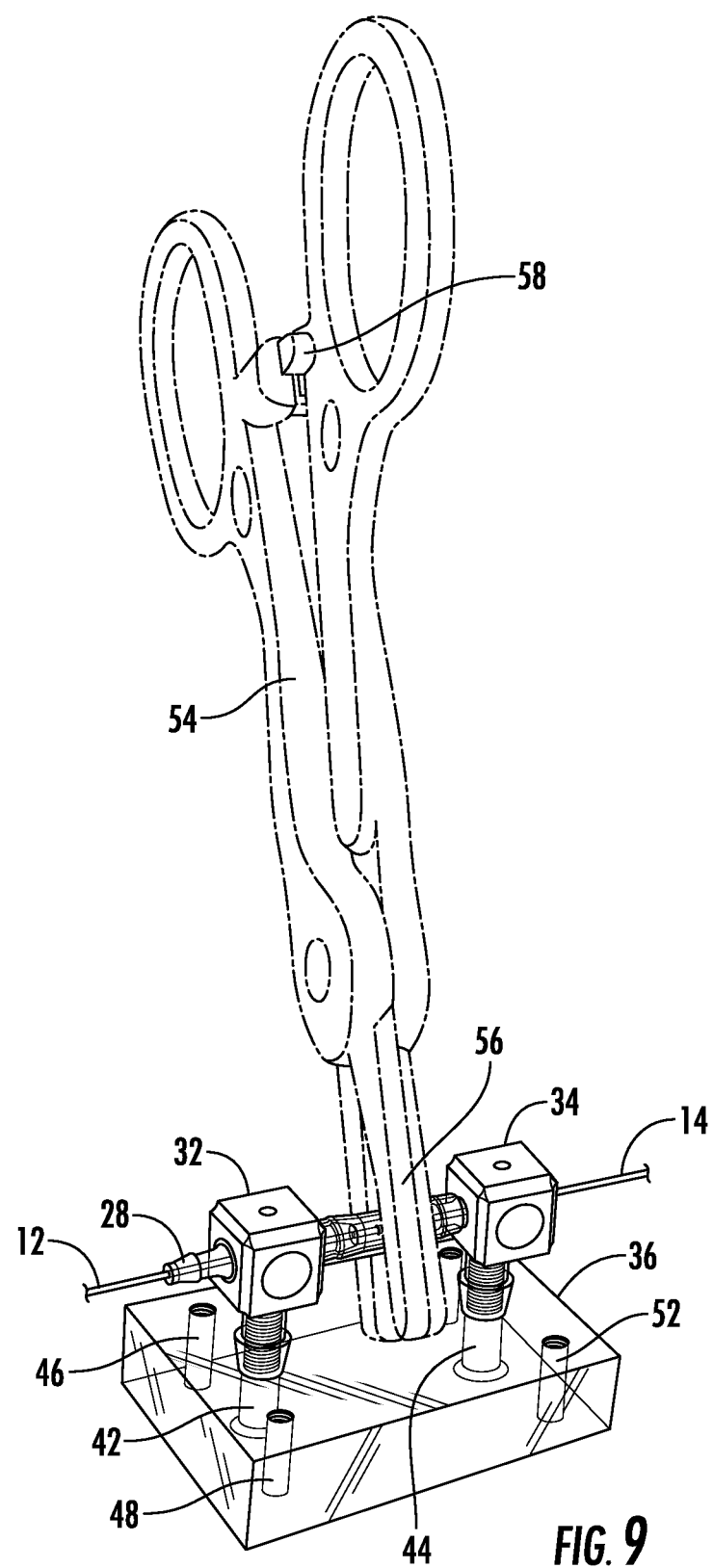
FIG. 9 illustrates a schematic diagram showing the blockage of the fluid path between the capillaries.

FIG. 9 illustrates a diagram showing an embodiment for blockage of the fluid path between capillaries 12 and 14. The blockage is made by compressing system 54 comprising a pressing force terminal area 56 and a locking device 58 for keeping the compressing force for as long as it is needed. Compressing system 54 is manually operated. Support towers 32 and 34 and guiding tubes 24, 26, 28 and 30, as well as other supporting structures permit the compression and decompression function without deteriorating the protecting flexible plastic system or breaking the capillaries.

Figure 10:
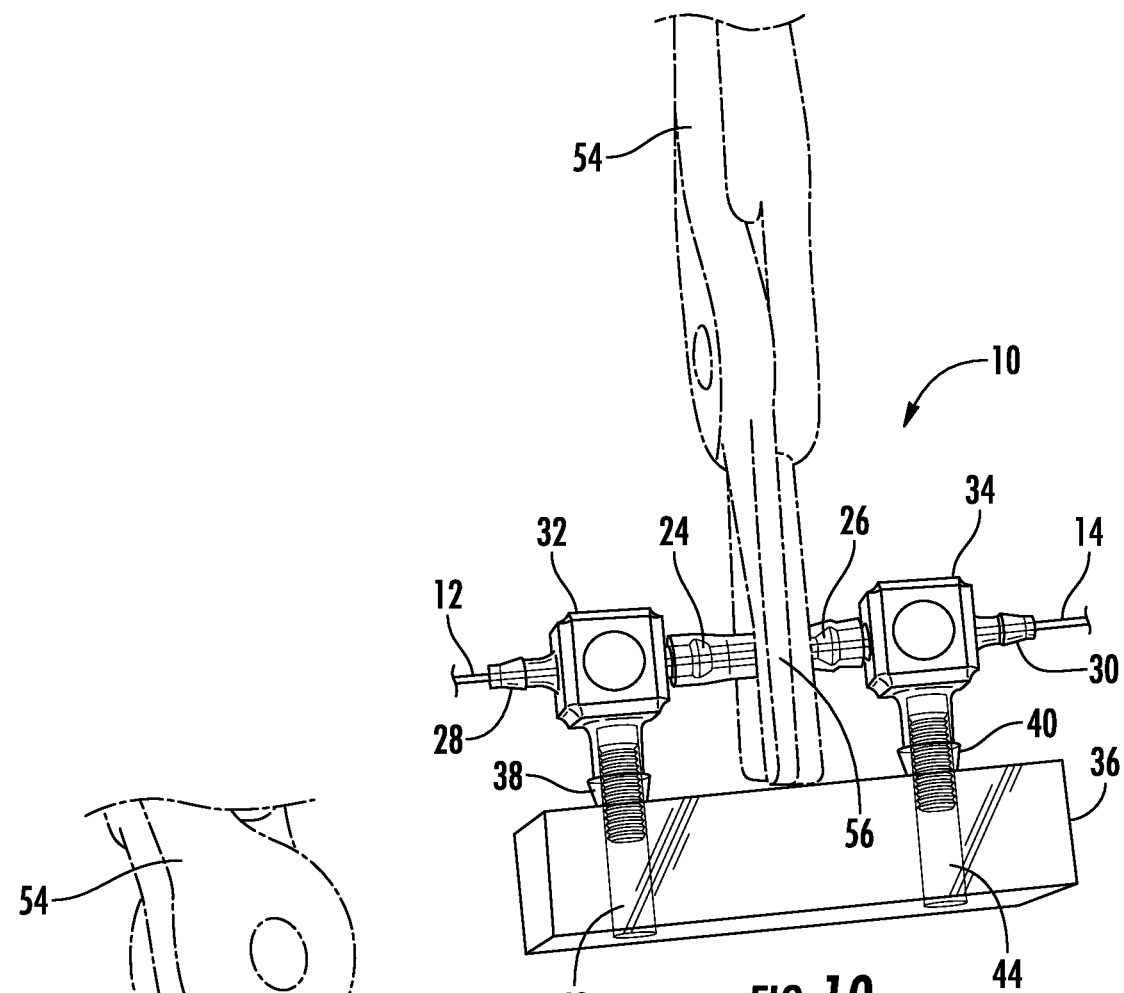
FIG. 10 illustrates a schematic diagram showing a side view of FIG. 9 of the blockage of the fluid path between the capillaries.

FIG. 10 illustrates a diagram showing a side view of FIG. 9 of the blockage of the fluid path between capillaries 12 and 14.

Figure 11:
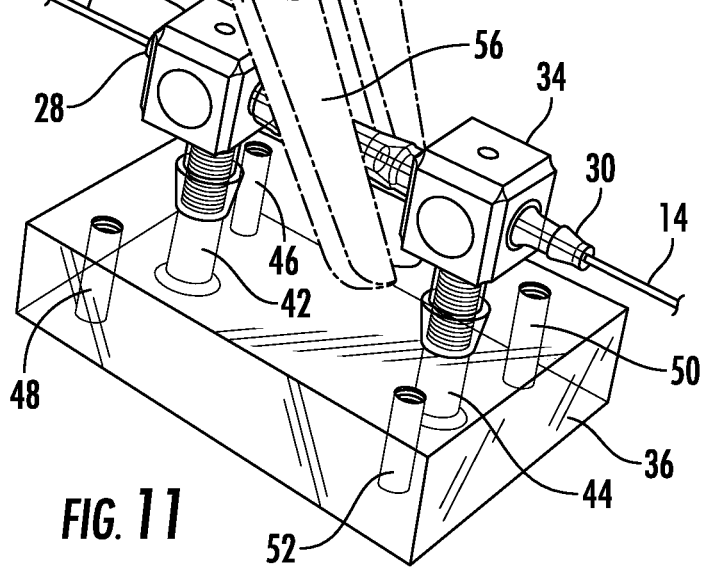
FIG. 11 illustrates a schematic diagram showing a top and angular view of FIG. 9 of the blockage of the fluid path between the capillaries.

FIG. 11 illustrates a diagram showing a top and angular view of FIG. 9 of the blockage of the fluid path between capillaries 12 and 14.

Figure 12:
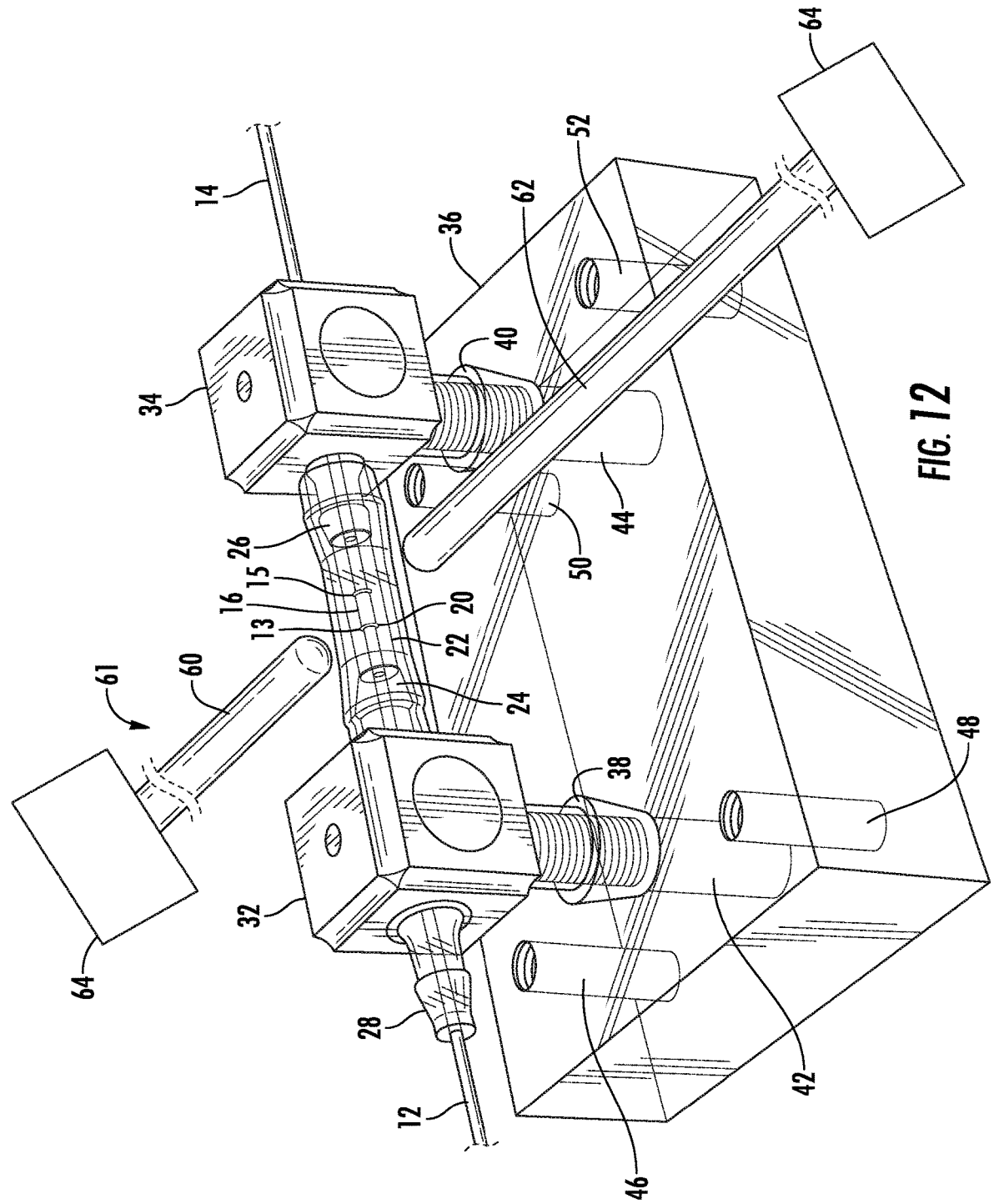
FIG. 12 illustrates an alternative embodiment for the blockage of the fluid path of the micro-valve system of the present invention as depicted in FIG. 1. The blockage of the fluid path is made by a compressing system comprised of poles.

FIG. 12 illustrates an alternative embodiment for the blockage of the fluid path of micro-valve system 10 of the present invention as depicted in FIG. 1. The blockage of the fluid path is made by compressing system 61. Compressing system 61 can be comprised of poles 60 and 62. Poles 60 and 62 can be formed of plastic or metal. Poles 60 and 62 can be placed in motion by a motorized system operated by computer controlled compressing system 64 that keep the compressing force for as long as it is needed.

Figure 13:
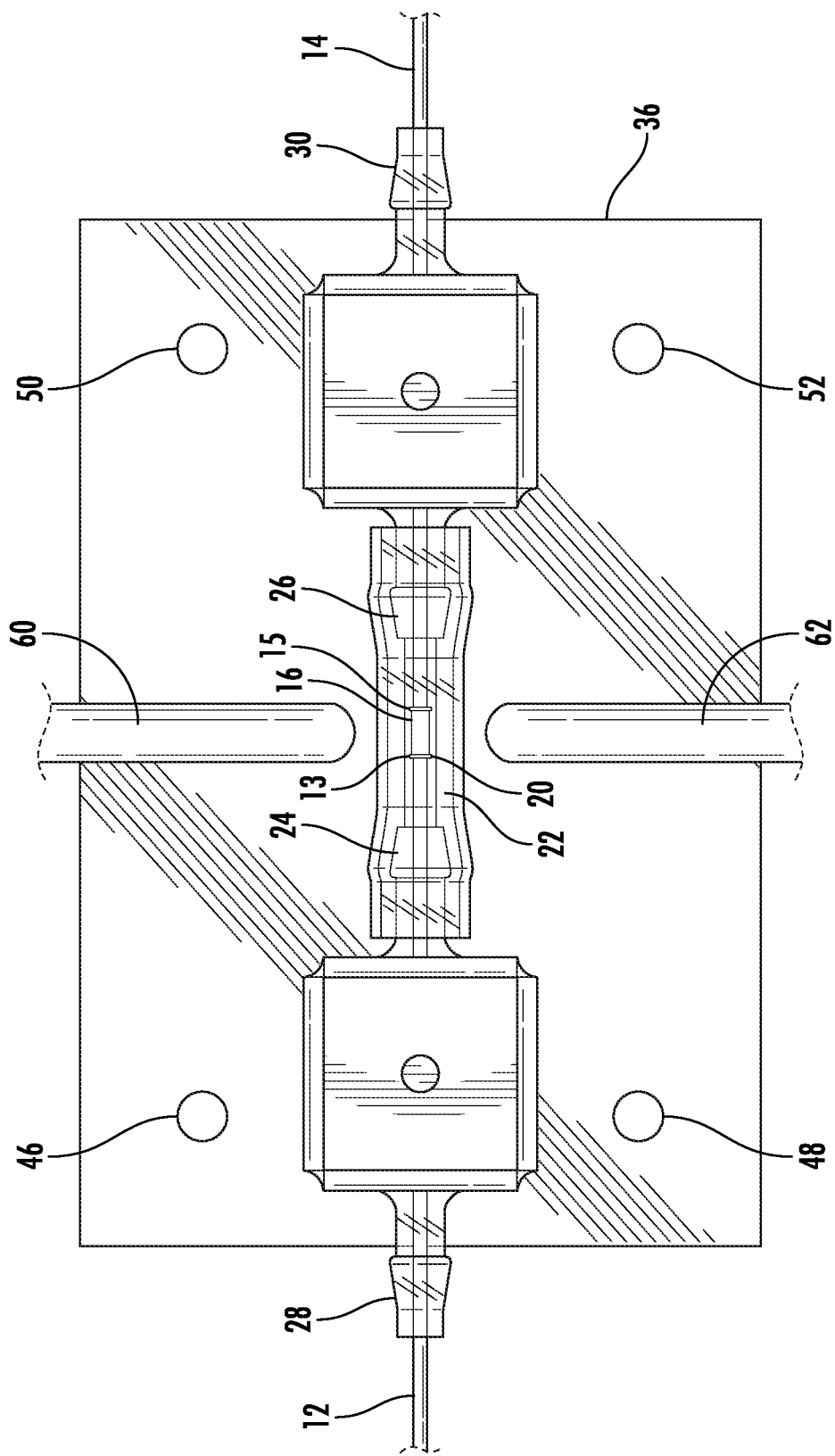
FIG. 13 illustrates a top view of the embodiment for the blockage of the fluid path of the micro-valve system of the present invention as depicted in FIG. 12.

FIG. 13 illustrates a top view of the embodiment of FIG. 12 for the blockage of the fluid path of micro-valve system 10 of the present invention as depicted in FIG. 1.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A micro-valve system comprising:
   a first capillary and a second capillary symmetrically positioned in between a first and second support towers and having a space between a first end of the first capillary and a first end of the second capillary;
   the first end of the first capillary being connected to a first end of a sleeve connector;
   the first end of the second capillary connected to a second end of the sleeve connector;
   the second end of the first capillary being supported by the first support tower;
   the second end of the second capillary being supported by the second support tower;
   a casing surrounding said sleeve connector, said casing comprising one or more layers, and
   a compressing system positioned adjacent the sleeve connector, the compressing system configured to compress the sleeve connector to block fluid flow between the first capillary and the second capillary,
   wherein the sleeve connector is formed of a flexible material and wherein said casing sustains pressure applied by said compressing system and protects said sleeve connector.

2. The micro-valve system of claim 1, wherein the first capillary and the second capillary are made of glass fused-silica, plastic, or a polymeric material.

3. The micro-valve system of claim 1 wherein the sleeve connector is made of a flexible plastic or polymer, wherein upon removing the pressure applied by said compressing system, the sleeve connector returns to its original shape for allowing fluid flow between the first capillary and the second capillary.

4. The micro-valve system of claim 1 wherein the sleeve connector is made of polyethylene, flexible polyvinyl chloride (PVC) or urethane.

5. The micro-valve system of claim 1 wherein the first end of the first capillary is hermetically sealed to the first end of the sleeve connector and the first end of the second capillary is hermetically sealed to the second end of the sleeve connector.

6. The micro-valve system of claim 5 further comprising a resin added at a junction area of the first end of the first capillary and the first end of the sleeve connector and the first end of the second capillary and the second end of the sleeve connector.

7. The micro-valve system of claim 1 wherein the one or more layers of said casing comprises a plurality of superimposed plastic tubes being concentrically positioned.

8. The micro-valve system of claim 1 wherein the one or more layers of said casing comprises a plurality of superimposed plastic tubes being concentrically positioned, the plastic tubes are formed of hard plastic or flexible plastic.

9. The micro-valve system of claim 1 wherein a material of said casing is harder than a material of said sleeve connector.

10. The micro-valve system of claim 1 further comprising a first guiding tube positioned on an internal side of the first support tower and a second guiding tube positioned on an internal side of the second support tower, the first guiding tube aligning with the first capillary and the second guiding tube aligning with the second capillary, the first and second guiding tubes providing support respectively for the first capillary and the second capillary.

11. The micro-valve system of claim 10 further comprising a casing surrounding said sleeve connector, said first guiding tube and said second guiding tube, said casing comprising one or more layers, wherein said casing sustains pressure applied by said compressing system and protects said sleeve connector.

12. The micro-valve system of claim 1 further comprising a platform having a first support pillar and a second support pillar, said first support tower is anchored to said first support pillar and said second support tower is anchored to said second support pillar.

13. The micro-valve system of claim 12 in which said first support pillar and said second support pillar include a threaded tunnel therein, the threaded tunnel of said first support pillar and said second support pillar being configured for receiving positioning screws to couple said first support pillar and said second support pillar to said platform.

14. The micro-valve system of claim 12 wherein the platform is portable and the first support pillar and the second support pillar are assembled to the platform.

15. The micro-valve system of claim 1 wherein said platform includes one or more threaded tunnels, the one or more threaded tunnels of said platform being configured for receiving positioning a screw or fastener to couple said platform to a surface.

16. The micro-valve system of claim 1 wherein the compressing system comprises a manual clamping system comprising a pressing force terminal area and a locking device.

17. The micro-valve system of claim 16 wherein the manual clamping system comprises tube occluding forceps to clamp the sleeve connector to block fluid flow between the first capillary and the second capillary.

18. The micro-valve system of claim 1 comprising a coupler is positioned at an outlet end of each of the first and second capillaries, the couplers configured to connect hermetically to respective third and fourth capillaries used for sample and buffer introduction and for separation of analytes, wherein the couplers allow the micro-valve system to be interchangeable.

19. The micro-valve system of claim 1 wherein the micro-valve system is used for capillary electrophoresis applications, gas chromatography applications, or liquid chromatography applications.

20. A micro-valve system comprising:
a first capillary and a second capillary symmetrically positioned in between a first and second support towers and having a space between a first end of the first capillary and a first end of the second capillary;
the first end of the first capillary being connected to a first end of a sleeve connector;
the first end of the second capillary connected to a second end of the sleeve connector;
the second end of the first capillary being supported by the first support tower; and
a compressing system positioned adjacent the sleeve connector, the compressing system configured to compress the sleeve connector to block fluid flow between the first capillary and the second capillary,
wherein the sleeve connector is formed of a flexible material and
wherein the compressing system comprises a pair of poles, the poles being positioned on either side of the connector sleeve, a motorized system operated by a computer moves the poles toward and away from the connector sleeve, the poles contacting the connector sleeve to provide a compressing force to block fluid flow between the first capillary and the second capillary.

21. The micro-valve system of claim 20 wherein the poles are made of hard plastic, non-metal polymeric material, or a metal.

* * * * *